United States Patent [19]

Bakker

[11] Patent Number: 4,570,528

[45] Date of Patent: Feb. 18, 1986

[54] KEYBOARD FOR A CARILLON

[75] Inventor: Peter Bakker, Nijkerk, Netherlands

[73] Assignee: Koninklijke Eijsbouts Klokkengieterij En Fabriek Van Torenuurwerken B.V., Asten, Netherlands

[21] Appl. No.: 504,487

[22] Filed: Jun. 15, 1983

[30] Foreign Application Priority Data

Jun. 17, 1982 [NL] Netherlands ............... 8202457

[51] Int. Cl.$^4$ ............................................. G10C 3/12
[52] U.S. Cl. ................................................. 84/423 R
[58] Field of Search .................................. 84/72-78, 84/225-232, 312 P, 353, 357-358, 366, 426, 444, DIG. 25, 423 R

[56] References Cited

U.S. PATENT DOCUMENTS 3,362,504  1/1968  Duarte ............................ 188/381

FOREIGN PATENT DOCUMENTS 96390   2/1897  Fed. Rep. of Germany.
205198  7/1907  Fed. Rep. of Germany.

Primary Examiner—Benjamin R. Fuller
Attorney, Agent, or Firm—Watson, Cole, Grindle & Watson

[57] ABSTRACT

In a carillon or chimes keyboard, which may be a manual or a pedal set, the keys (sticks or pedals) and the frame for taking them up pivotally are provided with cooperating surfaces, one surface on the key hitting the other surface on the frame at the end of the upward release movement of the key after it has been depressed for operating a bell.

For dampening the clattering noise caused by this hitting, the invention provides for such cooperating surfaces on the keys and the frame, which are inclined, preferably at about 30°, to the upward direction of movement of the keys just before they hit on the frame during this release movement.

5 Claims, 1 Drawing Figure

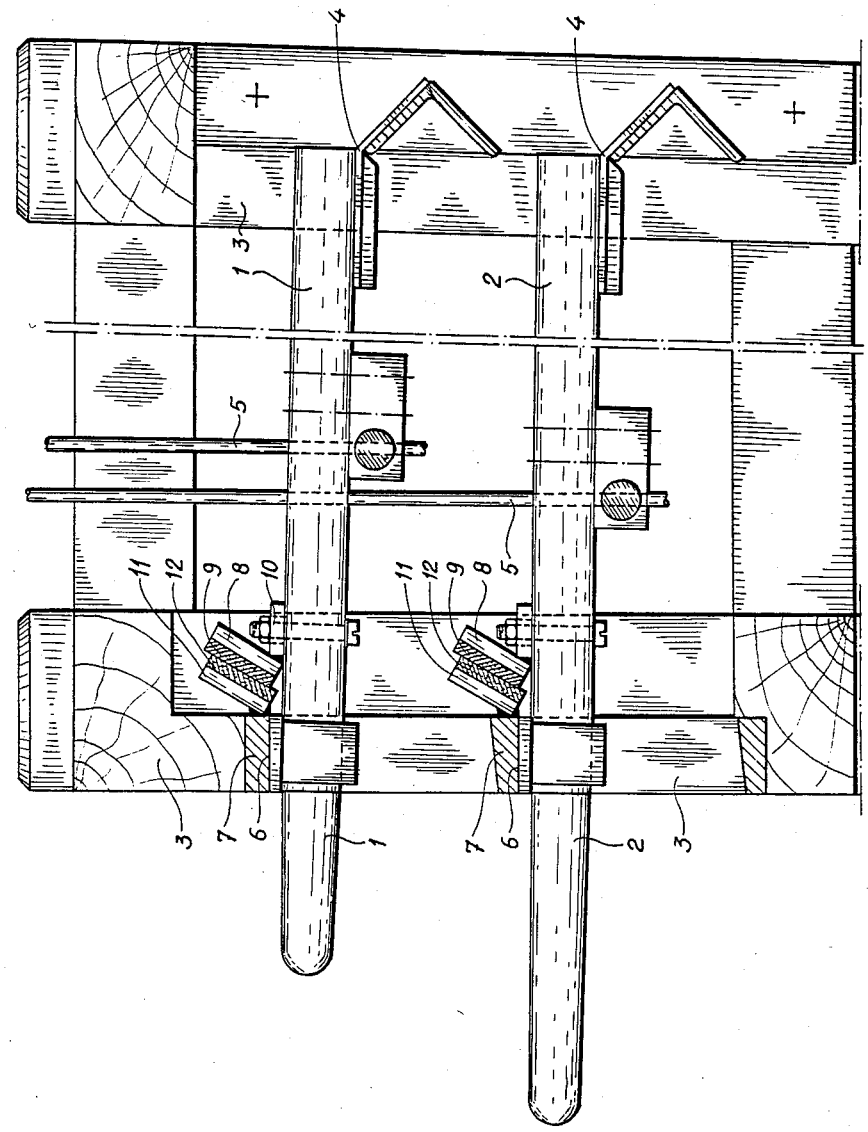

KEYBOARD FOR A CARILLON

In a keyboard for a carillon the keys, (sticks or pedals) are connected to the wires which through suitable intermediary mechanisms are connected to the clappers or tongues. In the inoperative position such keys are in their highest position, there being a pulling force pulling them upwardly, normally by the weight of the clapper and if desired instead thereof or supplementary thereto by an auxiliary spring. The carillonneur makes the bells ring by hitting the sticks with his lightly clenched fist to move them downwardly or by pushing down the pedals by his feet. Immediately thereafter he releases such parts so that they move rapidly back into their initial position, which is their upper position. This is attended with a clattering noise which is often irritating. The cause thereof is to be found in the fact that the flat upper surface of the key hits the flat edge of the frame in which the keys are taken up. Auxiliary means such as felt, leather and the like can only in part remedy this defect.

This invention aims at bringing improvement in this respect and to this end a keyboard of a carillon, for hand or feet, is according to the invention characterized in that said frame and the keys are provided with cooperating surface parts limiting the upward movement of the keys by their mutual contact, which surfaces have an inclined position with respect to the upward direction of movement of the keys.

It has appeared that this entirely or almost entirely prevents the annoying clattering.

Preferably such cooperating surface parts are covered with noise dampening material such as felt.

A very favourable position of inclination for said inclined surfaces appears to be the position in which they are at about 30° with respect to said upward direction of movement, which means a position at about 60° to the keys where they are horizontal in their normal position.

BRIEF DESCRIPTION OF THE DRAWING

The invention will now be explained in more detail with reference to the enclosed drawing which gives a side view and in part a vertical section of a part of a carillon keyboard, comprising two manuals (although as stated the invention may as well be applied for pedal sets for carillons in essentially the same manner).

DETAILED DESCRIPTION OF THE INVENTION

The parts of a carillon not shown in the drawing may be of any suitable design as amply known in practice and as for instance given in the book by Frank P. Price:"The carillon", Oxford University Press 1933, pp. 119 to 145.

The sticks 1 and 2 are mounted in a stationary frame 3, in which they are pivotable at 4 about a horizontal axis. Although there may be a usual pivot axis for instance with a circular shank and a cylindrical sleeve on the key engaging around the shank, the pivot may also be constituted by a flexible strip of leather or plastic material as shown, connected to a stationary part of the frame (at the right in the drawing) and with another part (the left part) to the key or stick 1, 2. Each stick is connected to a keyboardwire 5 extending upwardly to a usual lever mechanism, connected each to a clapper or tongue of a bell. This structure exerts an upward force on each stick, so that in known embodiments of the keyboard the stick is pulled upwardly into contact with the lower surface 6 of a horizontal framestrip 7 of the frame and when playing the carillon by pushing the sticks 1, 2 downwardly and then releasing them, the sticks hit this surface at considerable speed.

According to the invention each stick has a small inclined plate 8, which may have a feltlayer 9 thereon and which preferably is at a position of about 30° to the vertical. Said plate 8 may be plane and may consist of wood or metal. The adjacent strip 7 of the frame is provided with a small plate 11 being in the same inclined position as plate 8 and being provided with a feltlayer 12.

Said plates 8 and 11 are sufficiently rigid to prevent easy deformation and they are also sufficiently rigidly connected to the stick 1 or 2 and the frame respectively, to which end welding connections have been shown in the drawing, but for which of course also other suited connections are applicable. The plates 8 on the sticks 1 and 2 are each rigidly connected with a small mounting plate 10, which is rigidly connected to the stick by a bolt passing through a bore in the stick. As shown, this bolt has some clearance in the plate 10, so that this plate is somewhat adjustable in position with respect to the stick towards and away from the cooperating plate 11 on the frame. Moreover, the plate 10 is adjustable in angular position about a vertical axis being the axis of the bolt.

The plates 8 and 11 may have any desired extension perpendicular to the plane of the drawing, but in most cases only a slight protrusion to both sides of the stick is sufficient. Such plates may be plane but they might also be curved so that for instance when plate 8 is of convex shape in a plane perpendicular to the plane of the drawing, the plate 11 is of complementary concave shape and the reverse.

In practice it appears that, even when the plates 8 and 11 are not provided with a noise dampening coating or covering such as felt, the annoying clattering noise occurring in usual designs by the sticks hitting surfaces of the frame such as the surfaces 6, is entirely or almost entirely avoided and at least decreased to a level which is hardly noticeable. The felt coverings 9 and 12 reduce this noiselevel even further. Instead of felt, leather, rubber or massive elastic plastic materials may be used for such coverings.

I claim:

1. A carillon keyboard having a frame and keys mounted therein in which the frame and the keys themselves are respectively provided with limiting means having cooperating surfaces limiting the upward release movement of the keys by their mutual contact, said keys being pivotally mounted about a substantially longitudinal axis, said surfaces being in an inclined position with respect to the upward direction of release movement of the keys.

2. A carillon keyboard according to claim 1 in which said cooperating surfaces are the surfaces of a part of noise dampening material such as felt.

3. A carillon keyboard according to claim 1 in which said cooperating surfaces are at an angle of about 30° with respect to said upward direction of release movement of the keys.

4. A carillon keyboard according to claim 1 in which said cooperating surfaces are parallel to the pivoting axis of the keys.

5. A carillon keyboard according to claim 1 in which each inclined surface of the keys is formed by a surface of a mounting part having a substantially horizontal lower surface by which it rests on the key and which mounting part is connected thereto by a connection having a bolt passing with clearance through one of the parts to be connected to allow some horizontal adjustment of the mounting piece at least towards and away from the cooperating inclined surface on the frame.

* * * * *